(12) United States Patent
Nagai

(10) Patent No.: US 10,450,938 B2
(45) Date of Patent: Oct. 22, 2019

(54) COOLING CIRCUIT FOR INTERNAL COMBUSTION ENGINES

(71) Applicant: NISSAN MOTOR CO., LTD., Yokohama-shi, Kanagawa (JP)

(72) Inventor: Hiroyuki Nagai, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 19 days.

(21) Appl. No.: 15/312,750

(22) PCT Filed: May 23, 2014

(86) PCT No.: PCT/JP2014/063729
§ 371 (c)(1),
(2) Date: Nov. 21, 2016

(87) PCT Pub. No.: WO2015/177930
PCT Pub. Date: Nov. 26, 2015

(65) Prior Publication Data
US 2017/0184008 A1    Jun. 29, 2017

(51) Int. Cl.
*F01P 7/16* (2006.01)
*F01P 3/02* (2006.01)
(Continued)

(52) U.S. Cl.
CPC .................. *F01P 3/02* (2013.01); *F01N 5/02* (2013.01); *F01P 3/20* (2013.01); *F01P 7/167* (2013.01);
(Continued)

(58) Field of Classification Search
CPC ............ F01P 2007/146; F01P 2037/00; F01P 2060/00; F01P 3/00; F01P 3/18;
(Continued)

(56) References Cited

U.S. PATENT DOCUMENTS 8,689,741 B2 * 4/2014 Park ................... B60H 1/00778
123/41.05
2002/0189555 A1 * 12/2002 Murakami ................ F01P 3/20
123/41.1
(Continued)

FOREIGN PATENT DOCUMENTS

EP          2 441 935 A1    4/2012
JP          2007-218115 A   8/2007
(Continued)

*Primary Examiner* — Lindsay M Low
*Assistant Examiner* — Teuta B Holbrook
(74) *Attorney, Agent, or Firm* — Foley & Lardner LLP

(57) ABSTRACT

A cooling circuit for internal combustion engines includes an internal combustion engine, a pressure-feeding unit for feeding coolant, which cools the internal combustion engine under pressure, a valve unit having a plurality of heat exchangers connected in parallel thereto, an exhaust heat recovery system for recovering heat from exhaust air of the internal combustion engine by the coolant, a first circulation circuit including the pressure-feeding unit, the valve unit and the exhaust heat recovery system, and a second circulation circuit including the pressure-feeding unit and the exhaust heat recovery system.

11 Claims, 10 Drawing Sheets

(51) Int. Cl.
*F01N 5/02* (2006.01)
*F01P 3/20* (2006.01)
*F01P 11/20* (2006.01)
*F02B 29/04* (2006.01)

(52) U.S. Cl.
CPC .......... *F01P 11/20* (2013.01); *F02B 29/0412* (2013.01); *F01P 2060/16* (2013.01); *F01P 2060/18* (2013.01); *Y02T 10/146* (2013.01); *Y02T 10/16* (2013.01)

(58) Field of Classification Search
CPC .......... F01P 7/00; F02G 5/04; F02G 2260/00; B60H 1/00899; B60H 1/004; B60H 1/00485; F28D 21/0003; F28D 2021/008; F28D 2021/0089; B60K 11/02; F02B 29/0412; F02B 29/0437
USPC ......... 123/41.01, 41.02, 41.05, 41.08, 41.09, 123/41.1, 41.12, 41.29, 41.3, 41.44
See application file for complete search history.

(56) References Cited

U.S. PATENT DOCUMENTS

| | | | | |
|---|---|---|---|---|
| 2012/0137992 | A1* | 6/2012 | Kinomuka | F01P 7/165 123/41.08 |
| 2012/0199084 | A1* | 8/2012 | Kinomura | F01P 7/165 123/41.08 |
| 2013/0213322 | A1* | 8/2013 | Takeuchi | F01P 3/02 123/41.1 |
| 2013/0213324 | A1* | 8/2013 | Saitoh | F01P 7/165 123/41.09 |
| 2014/0000536 | A1* | 1/2014 | Glassford | F01P 3/20 123/41.08 |
| 2014/0165562 | A1* | 6/2014 | Nagai | F01P 7/165 60/615 |
| 2015/0240701 | A1* | 8/2015 | Amano | B60H 1/00314 123/41.02 |
| 2016/0102601 | A1* | 4/2016 | Hosokawa | F01P 7/14 123/41.08 |
| 2016/0341100 | A1* | 11/2016 | Nagai | F01N 5/02 |

FOREIGN PATENT DOCUMENTS

| | | |
|---|---|---|
| JP | 2008-202485 A | 9/2008 |
| JP | 2012-184754 A | 9/2012 |
| JP | 2013-024110 A | 2/2013 |
| JP | 2014-037785 A | 2/2014 |
| JP | 2014-070630 A | 4/2014 |

* cited by examiner

COOLING CIRCUIT FOR INTERNAL COMBUSTION ENGINES

TECHNICAL FIELD

The present invention relates to a cooling circuit for internal combustion engines.

BACKGROUND ART

A water-cooled engine in which coolant is caused to intermittently flow during warm-up is disclosed in JP2007-218115A.

SUMMARY OF INVENTION

In a cooling circuit for internal combustion engines with a circulation circuit, including a pressure-feeding unit for feeding coolant under pressure, a valve unit having a plurality of heat exchangers connected in parallel thereto, and an exhaust heat recovery system for collecting heat from exhaust air of the internal combustion engine by coolant, the flow of the coolant in the exhaust heat recovery system can be stopped by the valve unit.

In this case, however, in a state where flow of the coolant is stopped as described above, the temperature of the coolant in the exhaust heat recovery system increases excessively, and the coolant boils, the result being that bubbles may be generated in the coolant. The generated bubbles may cause a pressure feed failure of the pressure-feeding unit.

The present invention was developed in view of the above, and aims to provide a cooling circuit for internal combustion engines capable of preventing the occurrence of a pressure feed failure in a pressure-feeding unit due to bubbles generated in an exhaust heat recovery system.

A cooling circuit for internal combustion engines according to one aspect of the present invention includes an internal combustion engine, a pressure-feeding unit for feeding coolant under pressure, the coolant cooling the internal combustion engine, a valve unit having a plurality of heat exchangers connected in parallel thereto, an exhaust heat recovery system for recovering heat from exhaust air of the internal combustion engine by the coolant, a first circulation circuit including the pressure-feeding unit, the valve unit and the exhaust heat recovery system, and a second circulation circuit including the pressure-feeding unit and the exhaust heat recovery system.

DESCRIPTION OF EMBODIMENTS

Hereinafter, embodiments of the present invention are described with reference to the accompanying drawings. The same reference signs attached through several drawings indicate the same or corresponding components.

First Embodiment

Figure 1:
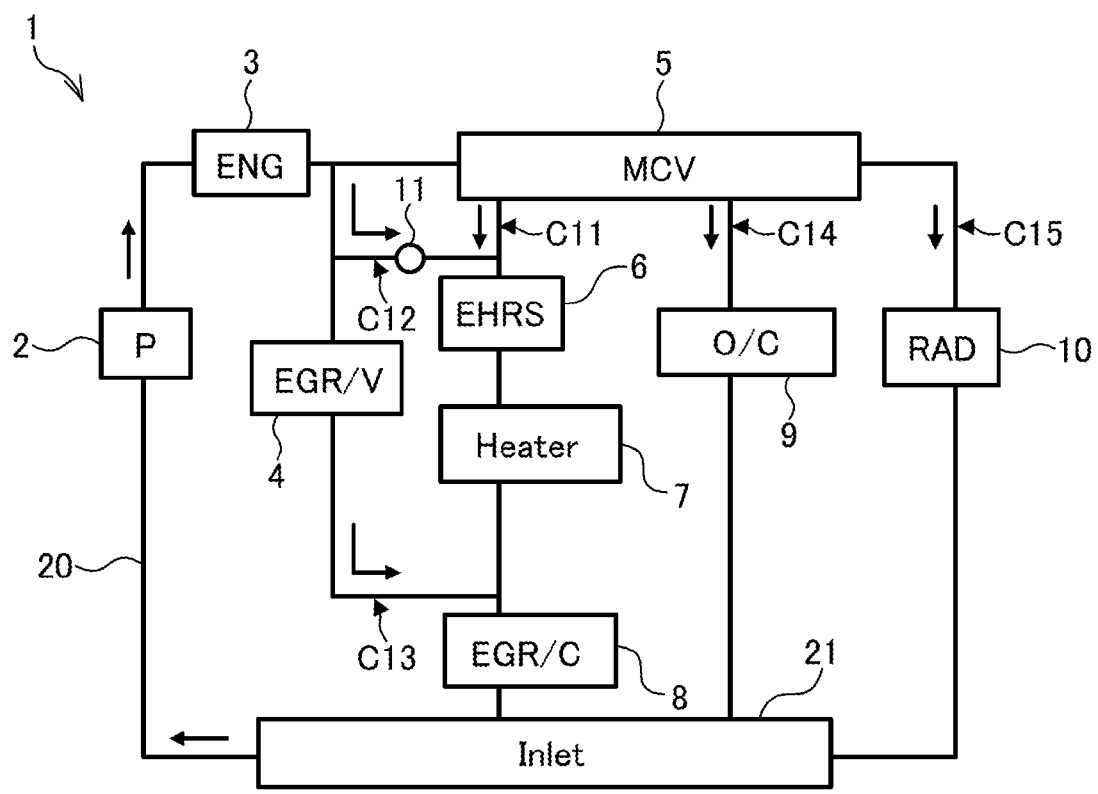
FIG. 1 is a schematic configuration diagram of a cooling circuit for internal combustion engines according to a first embodiment.

FIG. 1 is a schematic configuration diagram of a cooling circuit 1 for internal combustion engines according to a first embodiment. The cooling circuit for internal combustion engines is called a cooling circuit below. The cooling circuit 1 includes a pump 2, an internal combustion engine 3, an EGR valve 4, a multi-control valve 5, an exhaust heat recovery system (EHRS) 6, a heater core 7, an EGR cooler 8, an oil cooler 9, a radiator 10, an orifice 11 and connection passages 20. Arrows along the connection passages 20 indicate flows of coolant for cooling the internal combustion engine 3. The cooling circuit 1 circulates the coolant. Antifreeze can be applied as the coolant.

The pump 2 feeds the coolant under pressure. A mechanical pump driven by power of the internal combustion engine 3 can be applied as the pump 2. The pump 2 includes a coolant inlet 21. The coolant inlet 21 is arranged in a housing of the pump 2. In FIG. 1, the coolant inlet 21 is shown at a position distant from the pump 2 for the convenience of description. The coolant inlet 21 may not be a part of the pump 2.

The internal combustion engine 3 is a water-cooled internal combustion engine to be cooled by the coolant. The internal combustion engine 3 is arranged with a cooling passage in which the coolant is caused to flow. The EGR valve 4 adjusts the flow rate of exhaust air refluxed from an exhaust system to an intake system of the internal combustion engine 3 i.e. EGR gas. The orifice 11 constitutes a throttle for throttling the flow rate of the flowing coolant.

The multi-control valve 5 changes the coolant flowing state in each of a plurality of heat exchangers. The multi-control valve is called MCV below. The heater core 7, the oil cooler 9 and the radiator 10 are connected in parallel to the MCV 5 as the plurality of heat exchangers. The heater core 7 is connected to the MCV 5 via the exhaust heat recovery system 6. In this way, each of the plurality of heat exchangers connected in parallel to the MCV 5 may be connected to the MCV 5 via another configuration.

The exhaust heat recovery system 6 uses the coolant to recover heat from the exhaust air of the internal combustion engine 3. Thus, the exhaust heat recovery system 6 recovers the exhaust heat of the internal combustion engine 3 by performing a heat exchange between the exhaust air of the internal combustion engine 3 and the coolant. The exhaust heat recovery system 6 is arranged in an exhaust passage of the internal combustion engine 3.

The heater core 7 heats air utilized to heat the inside of the cabin of a vehicle mounted with the internal combustion engine 3, through heat radiation from the coolant. The heater core 7 heats the air by performing a heat exchange between the air and the coolant. The EGR cooler 8 cools the EGR gas by performing a heat exchange between the coolant and the EGR gas. The EGR cooler 8 is arranged together with the EGR valve 4 in an exhaust reflux passage of the internal combustion engine 3.

The oil cooler 9 cools the lubricating oil of a transmission for changing the speed of output rotation of the internal combustion engine 3 through heat radiation to the coolant. The oil cooler 9 cools the lubricating oil by performing a heat exchange between the lubricating oil and the coolant. A continuously variable transmission can be applied as the transmission. The transmission may be an automatic transmission or a manual transmission.

The radiator 10 radiates heat from the coolant. Specifically, the radiator 10 radiates heat from the coolant by performing a heat exchange between fed air being blown, or traveling wind and the coolant.

The connection passages 20 form circulation circuits C11 and C12. The circulation circuit C11 is a circulation circuit including the pump 2, the MCV 5 and the exhaust heat recovery system 6. The circulation circuit C12 is a circulation circuit including the pump 2 and the exhaust heat recovery system 6.

The circulation circuit C11 circulates the coolant through the pump 2, the internal combustion engine 3, the MCV 5, the exhaust heat recovery system 6, the heater core 7 and the EGR cooler 8 in this order. The MCV 5 is arranged upstream of the exhaust heat recovery system 6 in the circulation circuit C11. Specifically, the MCV 5 is arranged between the internal combustion engine 3 and the exhaust heat recovery system 6. The heater core 7 is arranged downstream of the exhaust heat recovery system 6 in the circulation circuit C11. Specifically, the heater core 7 is arranged between the exhaust heat recovery system 6 and the coolant inlet 21.

The circulation circuit C12 circulates the coolant through the pump 2, the internal combustion engine 3, the orifice 11, the exhaust heat recovery system 6, the heater core 7 and the EGR cooler 8 in this order. The circulation circuit C12 circulates the coolant in a state where the pump 2 is feeding the coolant under pressure. Thus, the circulation circuit C12 causes the coolant to flow through the exhaust heat recovery system 6 in a state where the pump 2 is feeding the coolant under pressure.

The circulation circuit C12 joins the circulation circuit C11 at a position upstream of the exhaust heat recovery system 6. Specifically, the circulation circuit C12 joins the circulation circuit C11 between the MCV 5 and the exhaust heat recovery system 6. The circulation circuit C12 is branched off from the circulation circuit C11 at a position upstream of the MCV 5. Specifically, the circulation circuit C12 is branched off from the circulation circuit C11 between the pump 2 and the MCV 5. More specifically, the circulation circuit C12 is branched off from the circulation circuit C11 between the internal combustion engine 3 and the MCV 5.

The orifice 11 makes the flow rate of the coolant flowing through the exhaust heat recovery system 6 via the circulation circuit C12 smaller than that of the coolant flowing through the exhaust heat recovery system 6 via the circulation circuit C11. The orifice 11 is arranged in a part of the circulation circuit C12 not common to the circulation circuit C11.

The connection passages 20 also form circulation circuits C13, C14 and C15. The circulation circuit C13 is a circulation circuit including the pump 2 and the EGR valve 4. The circulation circuit C14 is a circulation circuit including the pump 2 and the oil cooler 9. The circulation circuit C15 is a circulation circuit including the pump 2 and the radiator 10.

The circulation circuit C13 circulates the coolant through the pump 2, the internal combustion engine 3, the EGR valve 4 and the EGR cooler 8 in this order. The circulation circuit C14 circulates the coolant through the pump 2, the internal combustion engine 3, the MCV 5 and the oil cooler 9 in this order. The circulation circuit C15 circulates the coolant through the pump 2, the internal combustion engine 3, the MCV 5 and the radiator 10 in this order.

In such a cooling circuit 1, the circulation circuits C11, C14 and C15 are branched off from each other in the MCV 5 and join each other in the coolant inlet 21.

Figure 2:
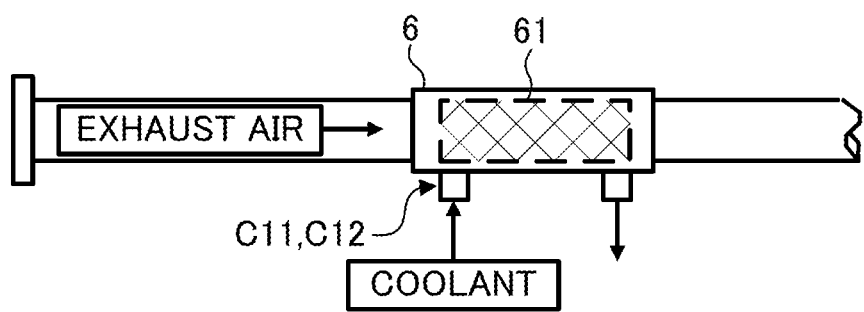
FIG. 2 is a diagram showing an exhaust heat recovery system.

FIG. 2 is a diagram showing the exhaust heat recovery system 6. The exhaust heat recovery system 6 includes a heat exchange unit 61 for performing a heat exchange between the exhaust air and the coolant. The heat exchange unit 61 is arranged in the exhaust heat recovery system 6. The exhaust air and the coolant flow through the heat exchange unit 61 as indicated by arrows. The exhaust heat recovery system 6 is configured as a bypass-less exhaust heat recovery system for causing the inflowing exhaust air to flow via the heat exchange unit 61. The circulation circuit C12 shares the heat exchange unit 61 with the circulation circuit C11.

Figure 3:
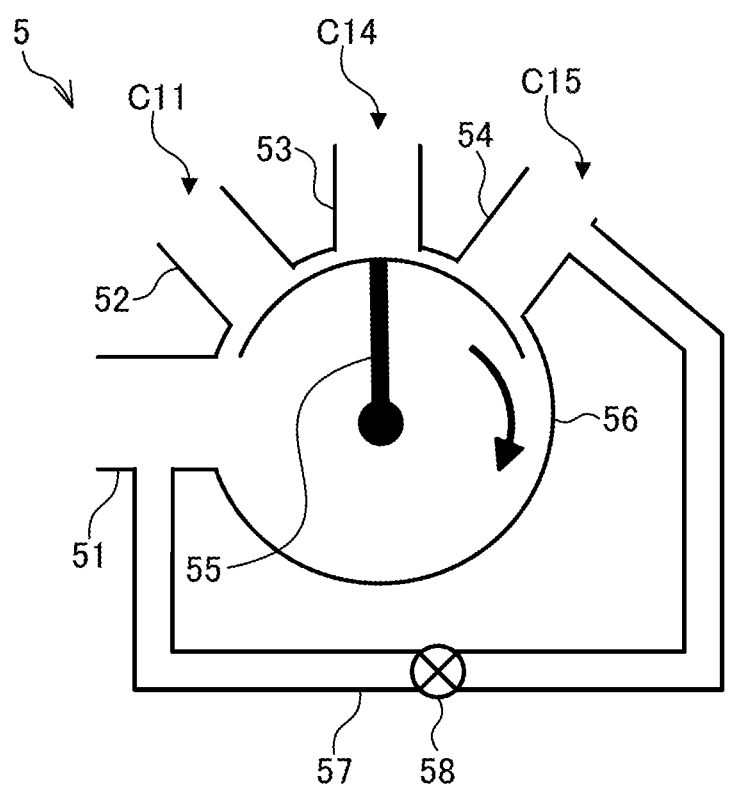
FIG. 3 is a diagram showing a multi-control valve.

FIG. 3 is a diagram showing the MCV 5. The MCV 5 is a rotary valve and includes openings 51, 52, 53 and 54 as a plurality of openings, a rotary valve body 55, a casing 56, a bypass passage 57 and a pressure relief valve 58.

The opening 51 is connected to the internal combustion engine 3. The opening 52 is connected to the heater core 7, the opening 53 to the oil cooler 9 and the opening 54 to the radiator 10. Specifically, the opening 52 is connected to the heater core 7 via the exhaust heat recovery system 6.

The opening 51 is an opening where the openings 52, 53 and 54 are joined and branched. The openings 52, 53 and 54 correspond to the heater core 7, the oil cooler 9 and the radiator 10. The openings 51, 52, 53 and 54 are arranged on the casing 56. The casing 56 has a tubular shape.

The rotary valve body 55 is housed in the casing 56. The rotary valve body 55 opens and closes the openings 51, 52, 53 and 54 by a rotary movement. The rotary valve body 55 is driven by an actuator for driving the rotary valve body 55. A stepping motor can be applied as this actuator.

The bypass passage 57 is a passage bypassing the rotary valve body 55 and arranged to allow communication between the openings 51 and 54, with the openings 51, 52 and 54 shut off by the rotary valve body 55. It should be noted that the bypass passage 57 may be arranged to allow communication between a part of the casing 56 not in contact with the rotary valve body 55 and the opening 54 instead of communication between the openings 51 and 54.

A pressure relief valve 58 is arranged in the bypass passage 57. The pressure relief valve 58 opens and closes according to an acting pressure of the coolant. The pressure relief valve 58 can be used as a differential pressure valve which is opened when the differential pressure of the coolant before and after this valve is not lower than a set pressure, and closed when the differential pressure of the coolant before and after this valve is lower than the set pressure.

The MCV 5 has a plurality of valve opening patterns to be described later according to a rotational position of the rotary valve body 55.

A first valve opening pattern is a pattern for shutting off all the circulation circuits passing through the MCV 5 including the circulation circuit C11, specifically the circulation circuits C11, C14 and C15 here. In the first valve opening pattern, the openings 52, 53 and 54 are shut off. As another example, the opening 51 can also be shut off in the first valve opening pattern. It should be noted that the valve opening patterns also include a case where all the circulation circuits passing through the MCV 5 are shut off in this way.

A second valve opening pattern is a pattern for causing the coolant to flow through the heater core 7 out of the heater core 7, the oil cooler 9 and the radiator 10. A third valve opening pattern is a pattern for causing the coolant to flow through the heater core 7 and the oil cooler 9 out of the heater core 7, the oil cooler 9 and the radiator 10. A fourth valve opening pattern is a pattern for causing the coolant to flow through the heater core 7, the oil cooler 9 and the radiator 10. In the second to fourth valve opening patterns, the coolant can be caused to selectively flow through at least any one of the heater core 7, the oil cooler 9 and the radiator 10.

A fifth valve opening pattern is a pattern for causing the coolant to flow through the radiator 10 out of the heater core 7, the oil cooler 9 and the radiator 10. The fifth valve opening pattern includes a case where the coolant is caused to selectively flow through the radiator 10 out of the heater core 7, the oil cooler 9 and the radiator 10, and a case where the pressure relief valve 58 is opened while the first valve opening pattern is selected. In the case of the present embodiment, the coolant can be caused to flow through only the radiator 10 out of the heater core 7, the oil cooler 9 and the radiator 10 in the fifth valve opening pattern.

Figure 4:
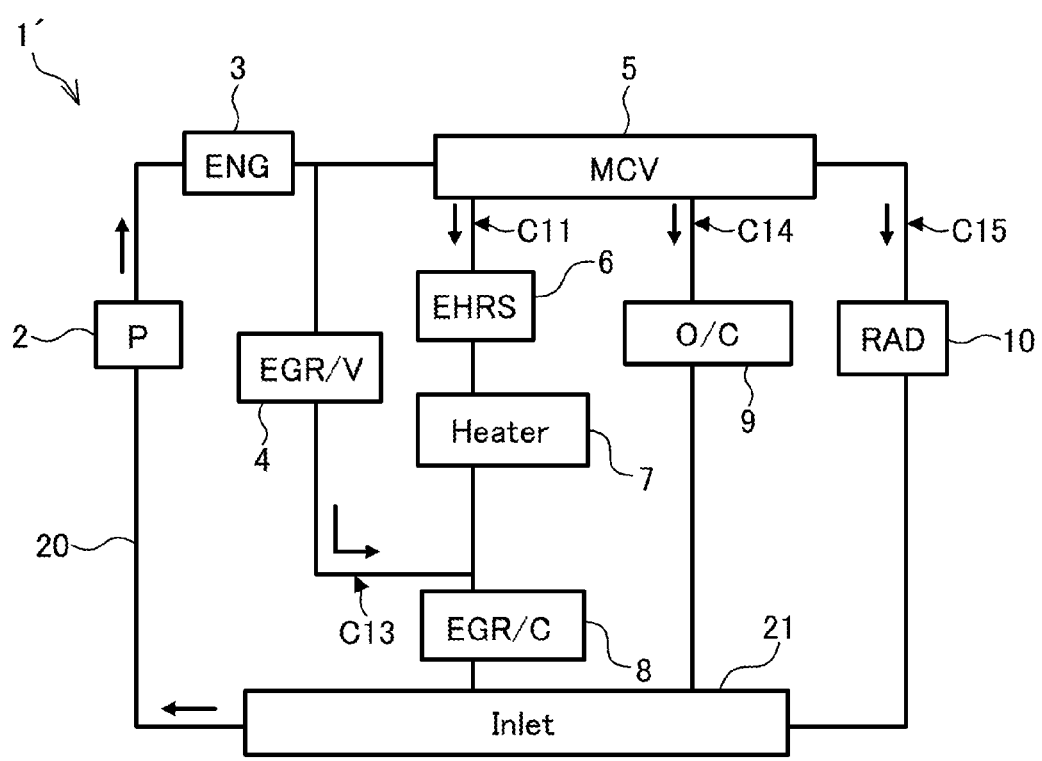
FIG. 4 is a diagram showing a comparative example of the cooling circuit for internal combustion engines.

Next, main functions and effects of the cooling circuit 1 according to the present embodiment are described. FIG. 4 is a diagram showing a cooling circuit 1' as a comparative example of the cooling circuit 1. As compared to the cooling circuit 1, the cooling circuit 1' does not include the orifice 11 and the circulation circuit C12. In such a cooling circuit 1', the flow of the coolant to the exhaust heat recovery system 6 can be stopped by the MCV 5. The MCV 5 stops the flow of the coolant to the exhaust heat recovery system 6 in, for example, the case of shutting off the openings 52, 53 and 54 by the first valve opening pattern to promote engine warm-up.

In this case, a flow rate of the coolant flowing through the internal combustion engine 3 is reduced by shutting off all the circulation circuits passing through the MCV 5, i.e. the circulation circuits C11, C14 and C15. As a result, engine warm-up is promoted. In this case, engine warm-up is promoted also by preventing the heat radiation of the coolant in the radiator 10.

However, in the cooling circuit 1', the temperature of the coolant excessively increases in the exhaust heat recovery system 6, and the coolant boils in a state where the flow of the coolant to the exhaust heat recovery system 6 is stopped as described above, with the result that bubbles may be generated in the coolant.

Such a situation can occur, for example, when a large amount of the exhaust air of the internal combustion engine 3 flows into the exhaust heat recovery system 6, in the state described above where the circulation circuits C11, C14 and C15 are shut off by the MCV 5. Further, this can occur when the MCV 5 can no longer be driven due to a mechanical issue such as fixation, or an electrical or control issue. When bubbles are generated in the coolant, the generated bubbles may induce a pressure feed failure of the pump 2.

In view of such a situation, the cooling circuit 1 includes the internal combustion engine 3, the pump 2, the MCV 5, the exhaust heat recovery system 6 and the circulation circuits C11 and C12.

The cooling circuit 1 configured as described above enables the coolant to be circulated in the circulation circuit C12, while ensuring a minimum flow rate, which is a flow rate not to cause a pressure feed failure of the pump 2 even if bubbles were generated in the exhaust heat recovery system 6, in a state where the circulation circuit C11 is shut off by the MCV 5. Thus, it is possible to prevent the occurrence of a pressure feed failure in the pump 2 due to bubbles generated in the exhaust heat recovery system 6. The cooling circuit 1 configured as described above can exhibit the above functions and effects when the circulation circuit C12 circulates the coolant in a state where the pump 2 is feeding the coolant under pressure.

In the cooling circuit 1, the MCV 5 is arranged upstream of the exhaust heat recovery system 6 in the circulation circuit C11. Further, the circulation circuit C12 is branched off from the circulation circuit C11 at the position upstream of the MCV 5, and joins the circulation circuit C11 at the position downstream of the MCV 5 and upstream of the exhaust heat recovery system 6 (specifically, between the MCV 5 and the exhaust heat recovery system 6) in the circulation circuit C11. In the case of having such a configuration, the cooling circuit 1 enables the coolant to be circulated in the circulation circuit C12 while ensuring the minimum flow rate in a state where the circulation circuit C11 is shut off by the MCV 5. As a result, it is possible to prevent the occurrence of a pressure feed failure in the pump 2 due to bubbles generated in the exhaust heat recovery system 6.

In the cooling circuit 1, the flow rate of the coolant passing through the exhaust heat recovery system 6 via the circulation circuit C12 is smaller than that of the coolant passing through the exhaust heat recovery system 6 via the circulation circuit C11. This is because the occurrence of a pressure feed failure in the pump 2 can be prevented if the minimum flow rate can be ensured. In the case of having such a configuration, the cooling circuit 1 can prevent the occurrence of a pressure feed failure in the pump 2 due to bubbles generated in the exhaust heat recovery system 6, while being compatible with both first and fifth valve opening patterns without making a drastic structural change or control change.

In the cooling circuit 1, the plurality of heat exchangers connected in parallel to the MCV 5 include the heater core 7, and the circulation circuit C11 includes the heater core 7. The cooling circuit 1 configured thus enables a further improvement of the heater core 7. The cooling circuit 1 configured thus can specifically assist the heating of air utilized to heat the inside of the cabin when the heater core 7 is arranged downstream of the exhaust heat recovery system 6 in the circulation circuit C11.

In the cooling circuit 1, the MCV 5 has the first valve opening pattern. The cooling circuit 1 is suitable in the case of such a configuration in view of the generation of bubbles in the coolant as described above using the cooling circuit 1'.

In the cooling circuit 1, the plurality of heat exchangers connected in parallel to the MCV 5 include the heater core 7, the oil cooler 9 and the radiator 10. The MCV 5 further has the second, third and fourth valve opening patterns. In the case of having such a configuration, the cooling circuit 1 can prevent the occurrence of a pressure feed failure in the pump 2 due to bubbles generated in the exhaust heat recovery system 6.

The fifth valve opening pattern is selected when the temperature of the coolant is high. Further, the fifth valve opening pattern is selected by the opening of the pressure relief valve 58 as a failsafe when a mechanical, electrical or control issue occurs in the MCV 5 while the first valve opening pattern is selected. When the fifth valve opening pattern including the failsafe is selected in this way, the temperature of the coolant is high and bubbles are likely to be generated in the exhaust heat recovery system 6. In light of such a situation, the cooling circuit 1 is suitable when the MCV 5 further has the fifth valve opening pattern.

In the cooling circuit 1, the exhaust heat recovery system 6 is configured as a bypass-less exhaust heat recovery system. In this case, the exhaust air flowing into the exhaust heat recovery system 6 flows through the heat exchange unit 61. As a result, if an engine operating state is a high-rotation high-load state, the temperature of the coolant is likely to be excessively increased by a large amount of the exhaust air. Accordingly, bubbles are likely to be generated in the exhaust heat recovery system 6. Thus, the cooling circuit 1 is suitable when the exhaust heat recovery system 6 is configured as described above.

The flow rate of the coolant passing through the exhaust heat recovery system 6 via the circulation circuit C12 can be set within a range of 1/30 to 1/10 of the flow rate of the coolant discharged by the pump 2. Specifically, in the cooling circuit 1, the flow rate of the coolant discharged by the pump 2 is about 10 L/min when a revolution speed of the internal combustion engine 3 is 1000 rpm to 2000 rpm. When the flow rate of the coolant discharged by the pump 2 is 10 L/min, the flow rate of the coolant passing through the exhaust heat recovery system 6 via the circulation circuit C12 is set within a range of 0.3 L/min to 1 L/min.

In this way, even in a situation where an output limitation of the internal combustion engine 3 is set when the fifth valve opening pattern corresponding to the failsafe is selected, for example, the ratio of bubbles contained in the coolant flowing into the pump 2 can be set lower than 0.5% at which the operation of the pump 2 becomes unstable.

Second Embodiment

Figure 5:
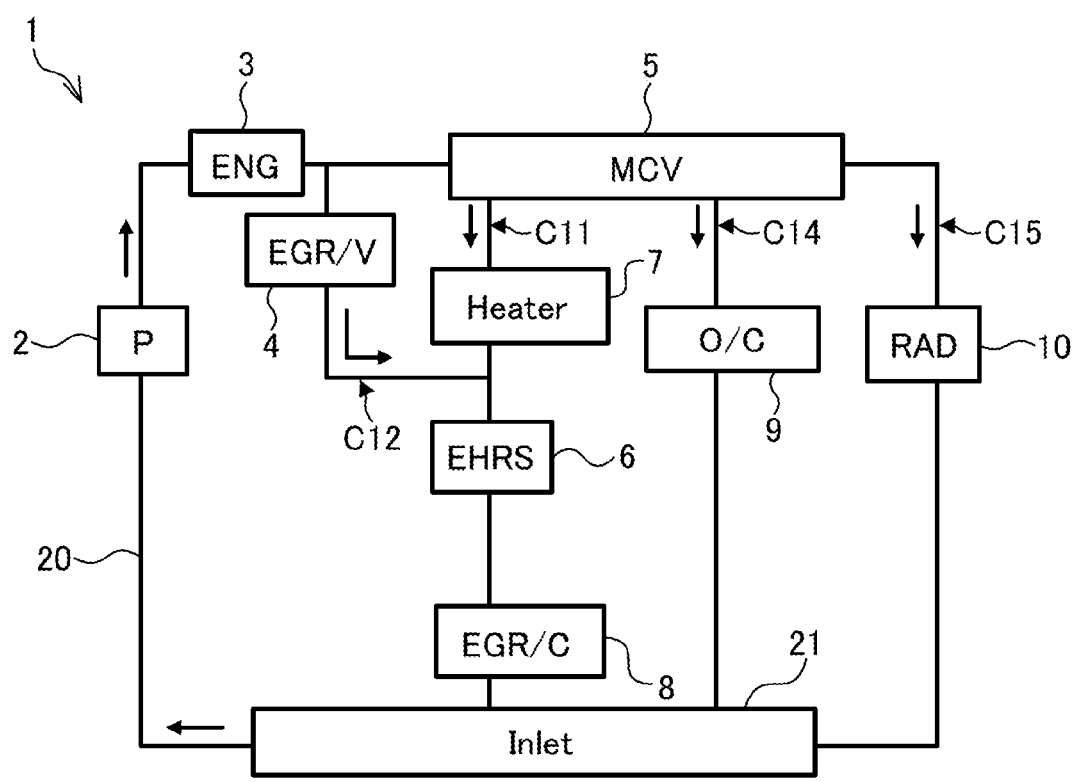
FIG. 5 is a schematic configuration diagram of a cooling circuit for internal combustion engines according to a second embodiment.

FIG. 5 is a schematic configuration diagram of a cooling circuit 1 according to a second embodiment. In the present embodiment, connection passages 20 form the following circulation circuits C11 and C12. In the present embodiment, the circulation circuit C12 doubles as the circulation circuit C13. Circulation circuits C14 and C15 are formed as in the first embodiment.

The circulation circuit C11 circulates coolant through a pump 2, an internal combustion engine 3, an MCV 5, a heater core 7, an exhaust heat recovery system 6 and an EGR cooler 8 in this order. Thus, the heater core 7 is arranged upstream of the exhaust heat recovery system 6 in the circulation circuit C11. Specifically, the heater core 7 is arranged between the MCV 5 and the exhaust heat recovery system 6. The circulation circuit C12 circulates the coolant through the pump 2, the internal combustion engine 3, an EGR valve 4, the exhaust heat recovery system 6 and the EGR cooler 8 in this order.

The cooling circuit 1 according to the present embodiment includes no orifice 11. Instead, in the cooling circuit 1 according to the present embodiment, the connection passage 20 of the circulation circuit C12 in a part not common to the circulation circuit C11 is partially or entirely configured as follows. Specifically, a flow rate of the coolant flowing through the exhaust heat recovery system 6 via the circulation circuit C12 is made smaller than that of the coolant flowing through the exhaust heat recovery system 6 via the circulation circuit C11.

Next, main functions and effects of the cooling circuit 1 according to the present embodiment are described. The cooling circuit 1 according to the present embodiment also enables the coolant to be circulated in the circulation circuit C12 while ensuring a minimum flow rate in a state where the circulation circuit C11 is shut off by the MCV 5. Thus, it is possible to prevent the occurrence of a pressure feed failure in the pump 2 due to bubbles generated in the exhaust heat recovery system 6.

In the present embodiment, the heater core 7 is arranged upstream of the exhaust heat recovery system 6 in the circulation circuit C11. The cooling circuit 1 configured thus also enables an improvement of the heater core 7. Specifically, in the case of having such a configuration, the cooling circuit 1 can prevent bubbles generated in the exhaust heat recovery system 6 from accumulating in the heater core 7, leading to a reduction of heat exchange efficiency.

The cooling circuit 1 can also set the flow rate of the coolant flowing through the exhaust heat recovery system 6 via the circulation circuit C12 in the above way instead of including the orifice 11.

Third Embodiment

Figure 6:
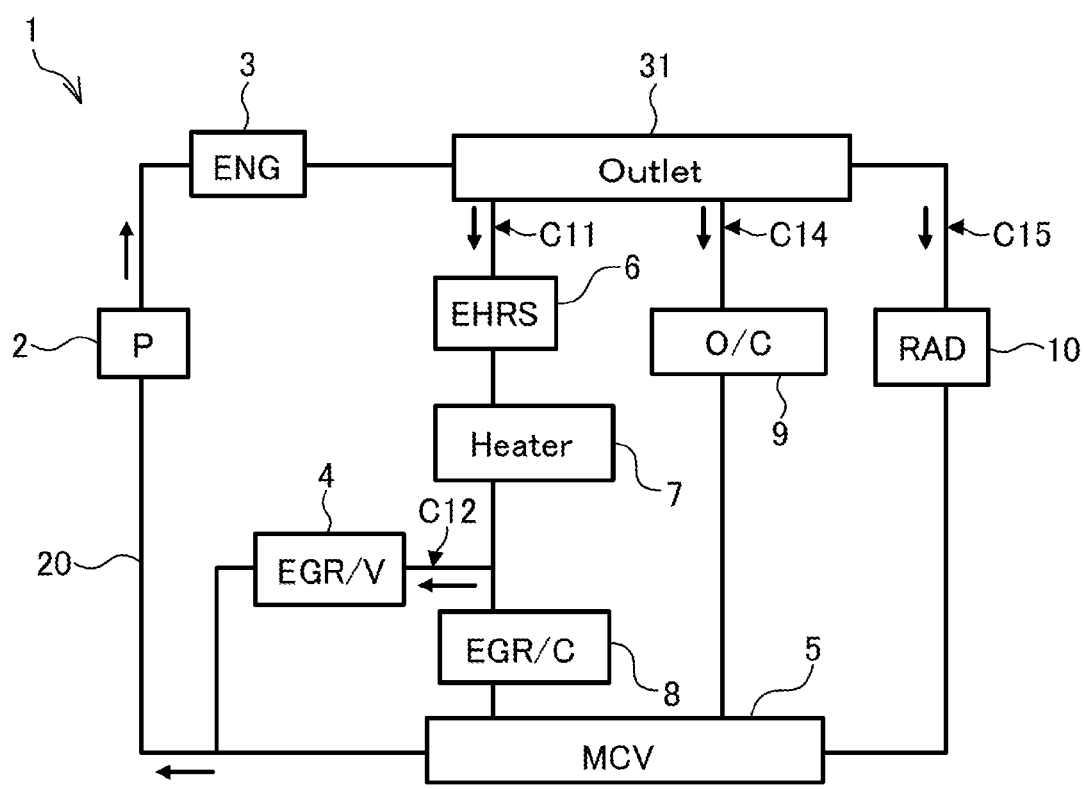
FIG. 6 is a schematic configuration diagram of a cooling circuit for internal combustion engines according to a third embodiment.

FIG. 6 is a schematic configuration diagram of a cooling circuit 1 according to a third embodiment. In the present embodiment, an internal combustion engine 3 includes a coolant outlet 31. In FIG. 6, the coolant outlet 31 is shown at a position distant from the internal combustion engine 3 for the convenience of description. The coolant outlet 31 may not be a part of the internal combustion engine 3. In the present embodiment, a pump 2 includes no coolant inlet 21 for causing the circulation circuits C11, C14 and C15 to join each other. In the present embodiment, an MCV 5 is arranged to be connected to an inlet side of the pump 2. The cooling circuit 1 includes no orifice 11 as in the second embodiment.

In the present embodiment, connection passages 20 form the following circulation circuits C11, C12, C14 and C15. In the present embodiment, the circulation circuit C12 doubles as the circulation circuit C13.

The circulation circuit C11 circulates coolant through the pump 2, the internal combustion engine 3, an exhaust heat recovery system 6, a heater core 7, an EGR cooler 8 and the MCV 5 in this order. Thus, the MCV 5 is arranged downstream of the exhaust heat recovery system 6 in the circulation circuit C11. The circulation circuit C12 circulates the coolant through the pump 2, the internal combustion engine 3, the exhaust heat recovery system 6, the heater core 7 and an EGR valve 4 in this order.

The circulation circuit C12 is branched off from the circulation circuit C11 at a position downstream of the exhaust heat recovery system 6. Specifically, the circulation circuit C12 is branched off from the circulation circuit C11 between the exhaust heat recovery system 6 and the MCV 5. The circulation circuit C12 joins the circulation circuit C11 at a position downstream of the MCV 5. Specifically, the circulation circuit C12 joins the circulation circuit C11 between the MCV 5 and the pump 2.

The circulation circuit C14 circulates the coolant through the pump 2, the internal combustion engine 3, an oil cooler 9 and the MCV 5 in this order. The circulation circuit C15 circulates the coolant through the pump 2, the internal combustion engine 3, a radiator 10 and the MCV 5 in this order.

In such a cooling circuit 1, the circulation circuits C11, C14 and C15 are branched off from each other in the coolant outlet 31 and join each other in the MCV 5.

Next, main functions and effects of the cooling circuit 1 according to the present embodiment are described. In the cooling circuit 1 according to the present embodiment, the MCV 5 is arranged downstream of the exhaust heat recovery system 6 in the circulation circuit C11. Further, the circulation circuit C12 is branched off from the circulation circuit C11 at a position downstream of the exhaust heat recovery system 6 and upstream of the MCV 5 (i.e. between the exhaust heat recovery system 6 and the MCV 5) in the circulation circuit C11, and joins the circulation circuit C11 at a position downstream of the MCV 5. Also in the case of such a configuration, the cooling circuit 1 enables the coolant to be circulated in the circulation circuit C12, while ensuring a minimum flow rate in a state where the circulation circuit C11 is shut off by the MCV 5. Thus, it is possible to prevent the occurrence of a pressure feed failure in the pump 2 due to bubbles generated in the exhaust heat recovery system 6.

Fourth Embodiment

Figure 7:
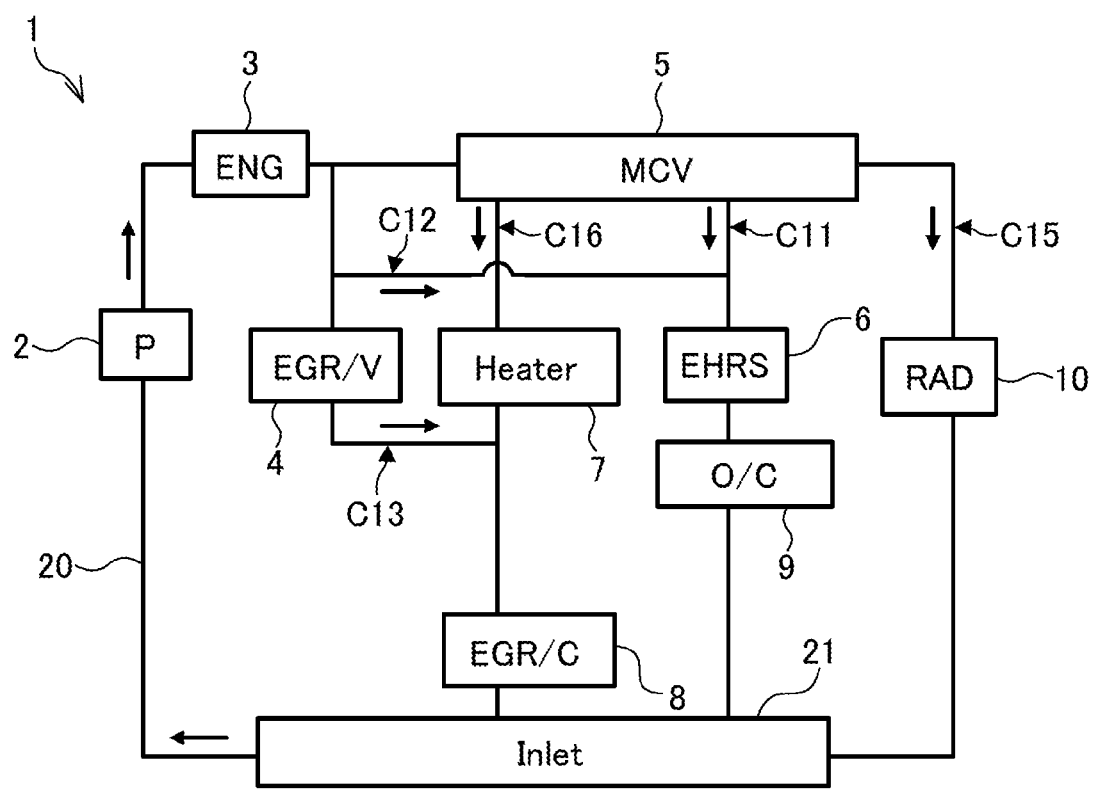
FIG. 7 is a schematic configuration diagram of a cooling circuit for internal combustion engines according to a fourth embodiment.

FIG. 7 is a schematic configuration diagram of a cooling circuit 1 according to a fourth embodiment. In the present embodiment, an MCV 5 is arranged upstream of an exhaust heat recovery system 6 in a circulation circuit C11, as in the first and second embodiments. In the present embodiment, the exhaust heat recovery system 6 is arranged upstream of an oil cooler 9. Specifically, the exhaust heat recovery system 6 is arranged between the MCV 5 and the oil cooler 9. The cooling circuit 1 includes no orifice 11 as in the second embodiment.

In the present embodiment, connection passages 20 form the following circulation circuits C11, C12 and C16. The circulation circuit C11 doubles as the circulation circuit C14. The circulation circuits C13 and C15 are formed as in the first embodiment.

The circulation circuit C11 circulates coolant through a pump 2, an internal combustion engine 3, the MCV 5, the exhaust heat recovery system 6 and the oil cooler 9 in this order. The circulation circuit C12 circulates the coolant through the pump 2, the internal combustion engine 3, the exhaust heat recovery system 6 and the oil cooler 9 in this order. Thus, the circulation circuits C11, C12 include the oil cooler 9. The circulation circuit C16 is a circulation circuit including a heater core 7. The circulation circuit C16 circulates the coolant through the pump 2, the internal combustion engine 3, the MCV 5, the heater core 7 and an EGR cooler 8 in this order.

In the cooling circuit 1 configured thus, the circulation circuits C11, C15 and C16 are branched off from each other in the MCV 5, and join each other in a coolant inlet 21.

Next, main functions and effects of the cooling circuit 1 according to the present embodiment are described. The cooling circuit 1 according to the present embodiment also enables the coolant to be circulated in the circulation circuit C12 while ensuring a minimum flow rate in a state where the circulation circuit C11 is shut off by the MCV 5. Thus, it is possible to prevent the occurrence of a pressure feed failure in the pump 2 due to bubbles generated in the exhaust heat recovery system 6.

In the cooling circuit 1 according to the present embodiment, a plurality of heat exchangers connected in parallel to the MCV 5 includes the oil cooler 9. Further, the circulation circuits C11 and C12 include the oil cooler 9, and the exhaust heat recovery system 6 is arranged upstream of the oil cooler 9. The cooling circuit 1 configured thus can utilize heat recovered by the exhaust heat recovery system 6 to heat lubricating oil in the oil cooler 9. This further enables the warm-up of a transmission for changing the speed of output rotation of the internal combustion engine 3. Specifically, the cooling circuit 1 can improve the fuel economy of the internal combustion engine 3 by warming up the transmission.

Fifth Embodiment

Figure 8:
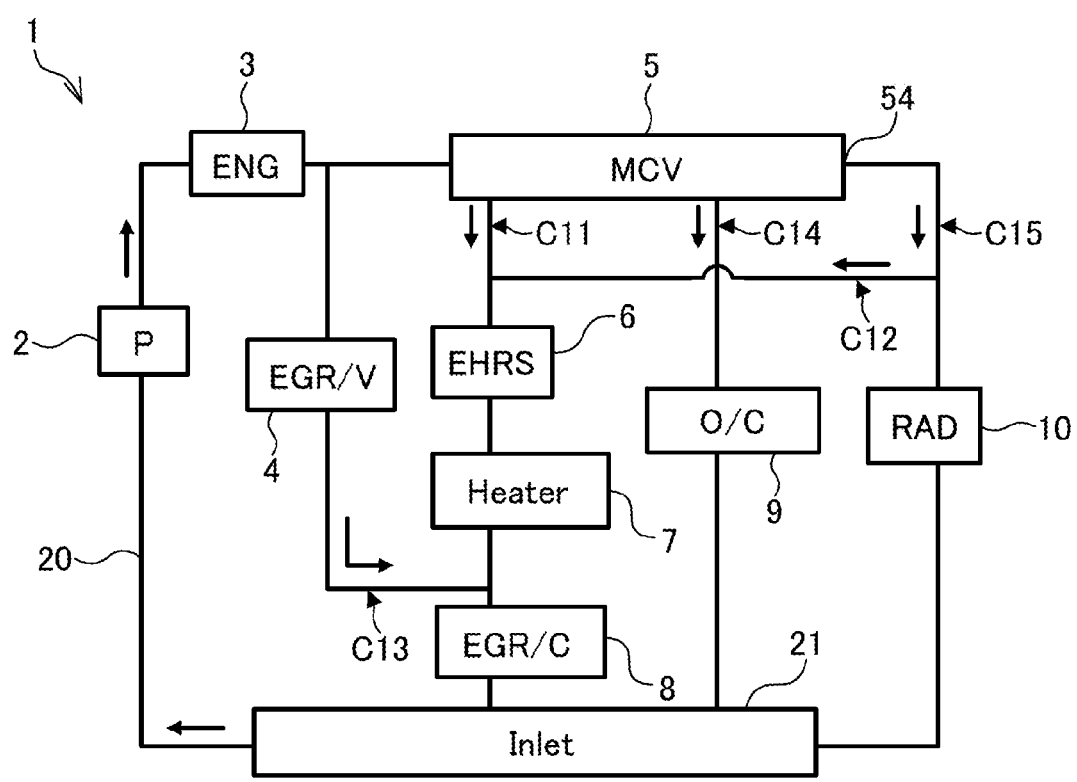
FIG. 8 is a schematic configuration diagram of a cooling circuit for internal combustion engines according to a fifth embodiment.

FIG. 8 is a schematic configuration diagram of a cooling circuit 1 according to a fifth embodiment. In the present embodiment, connection passages 20 form the following circulation circuit C12. Circulation circuits C11, C13, C14 and C15 are formed as in the first embodiment. The cooling circuit 1 includes no orifice 11 as in the second embodiment.

In the present embodiment, the circulation circuit C12 circulates coolant through a pump 2, an internal combustion engine 3, an MCV 5, an exhaust heat recovery system 6, a heat core 7 and an EGR cooler 8 in this order. The circulation circuit C12 configured thus further includes the MCV 5 in addition to the exhaust heat recovery system 6. Further, the coolant is caused to flow via an opening 54.

In the present embodiment, the MCV 5 has no first valve opening pattern, while having a second, third, fourth and fifth valve opening pattern as a plurality of valve opening patterns. In the present embodiment, the coolant is caused to also flow through the heat core 7 via the circulation circuit C12 in the case of causing the coolant to selectively flow through a radiator 10 out of the heat core 7, an oil cooler 9 and the radiator 10 in the fifth valve opening pattern.

Next, main functions and effects of the cooling circuit 1 of the present embodiment are described. The cooling circuit 1 of the present embodiment is configured as described above. As a result, it is possible to circulate the coolant via the circulation circuit C12 while ensuring a minimum flow rate while the fifth valve opening pattern including a failsafe is selected. Thus, the cooling circuit 1 configured thus can prevent the occurrence of a pressure feed failure in the pump 2 due to bubbles generated in the exhaust heat recovery system 6, while the fifth valve opening pattern including the failsafe is selected.

Although the embodiments of the present invention have been described above, the above embodiments are merely an illustration of some applicable examples of the present invention, and not intended to limit the technical scope of the present invention to the specific configurations of the above embodiments.

In the above embodiments, there has been described a case where the exhaust heat recovery system 6 is connected in series to any one of the plurality of heat exchangers connected in parallel to the MCV 5. However, the exhaust heat recovery system 6 may be connected in series to none of the plurality of heat exchangers. Specifically, the exhaust heat recovery system 6 may be singly arranged as a heat exchanger in the circulation circuit C11.

Figure 9:
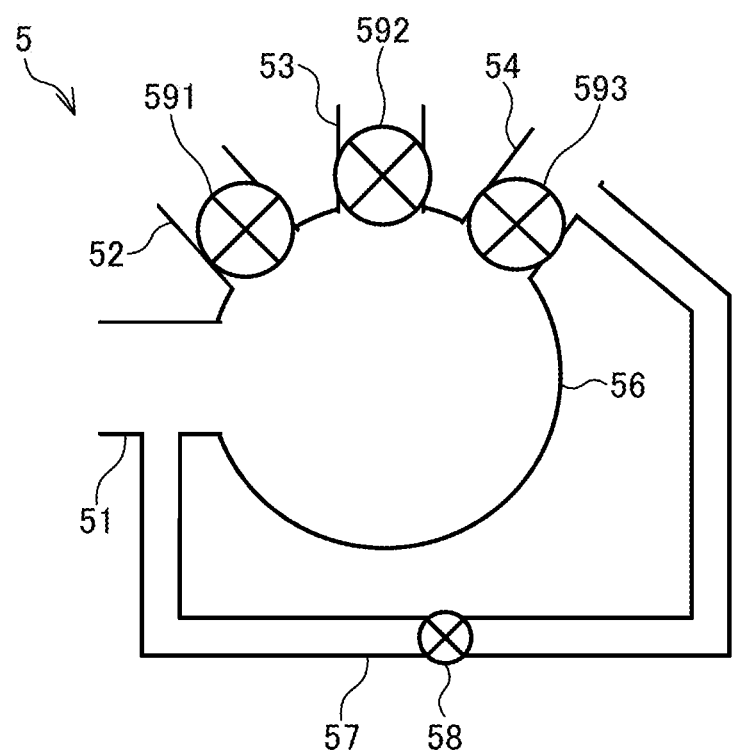
FIG. 9 is a diagram showing a modification of the multi-control valve.

As shown in FIG. 9, the MCV 5 may be configured to include electromagnetic valves 591 to 593, which are a plurality of electromagnetic valves. The MCV 5 shown in FIG. 9 includes the electromagnetic valves 591 to 593, instead of the rotary valve body 55 as compared to the MCVs 5 of the above embodiments and the electromagnetic valves 591 to 593 are individually controlled to be opened and closed to correspond to the aforementioned first to fifth valve opening patterns. The electromagnetic valves 591 to 593 are respectively arranged in the openings 52, 53 and 54. A plurality of heat exchangers can be connected in parallel to such an MCV 5 also.

Figure 10:
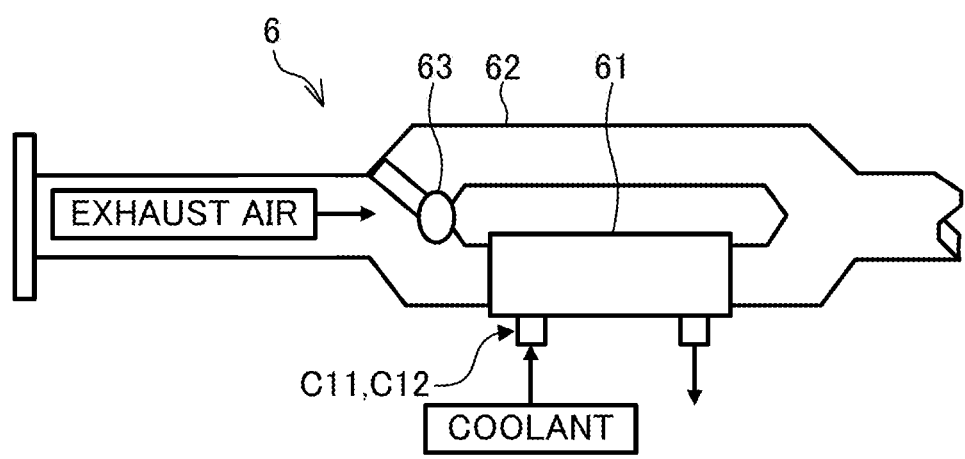
FIG. 10 is a diagram showing a modification of the exhaust heat recovery system.

As shown in FIG. 10, a bypass exhaust heat recovery system further including a bypass passage 62 bypassing a heat exchange unit 61 and a bypass valve 63 for opening and shutting off the bypass passage 62 can also be applied as the exhaust heat recovery system 6. A valve for causing exhaust air to flow through the heat exchange unit 61 in the case of shutting off the bypass passage 62 can be applied as the bypass valve 63.

Also in this case, the cooling circuit 1 can prevent the occurrence of a pressure feed failure in the pump 2 due to bubbles generated in the exhaust heat recovery system 6, for example, when a fault occurs with the bypass valve 63 in a state where the bypass passage 62 is kept shut off.

The invention claimed is:

1. A cooling circuit for an internal combustion engine, comprising:
an internal combustion engine;
a pressure-feeding pump configured to feed coolant under pressure, the coolant cooling the internal combustion engine;
a valve unit having a plurality of heat exchangers connected in parallel thereto and configured to change a coolant flowing state in the plurality of heat exchangers;
an exhaust heat recovery system configured to recover heat from exhaust air of the internal combustion engine by the coolant;
a first circulation circuit including the pressure-feeding pump, the valve unit and the exhaust heat recovery system; and
a second circulation circuit not including the valve unit and including the pressure-feeding pump and the exhaust heat recovery system,
wherein a flow rate of the coolant flowing through the exhaust heat recovery system via the second circulation circuit is made smaller than that of the coolant flowing through the exhaust heat recovery system via the first circulation circuit by an orifice arranged in the second circulation circuit or by a passage of the second circulation circuit, and the pressure-feeding pump is a mechanical pump driven by power of the internal combustion engine.

2. The cooling circuit according to claim 1, wherein:
the valve unit is arranged upstream of the exhaust heat recovery system in the first circulation circuit; and
the second circulation circuit is branched off from the first circulation circuit at a position upstream of the valve unit and joins the first circulation circuit between the valve unit and the exhaust heat recovery system.

3. The cooling circuit according to claim 2, wherein:
the valve unit has a valve opening pattern configured to shut off all circulation circuits passing through the valve unit including the first circulation circuit.

4. The cooling circuit according to claim 3, wherein:
the plurality of heat exchangers includes
a heater to heat an inside of a cabin of a vehicle mounted with the internal combustion engine through heat radiation from the coolant;
a cooler to cool lubricating oil of a transmission configured to change a speed of output rotation of the internal combustion engine through heat radiation to the coolant; and
a radiator configured to radiate heat of the coolant; and
the valve unit includes
a valve opening pattern configured to cause the coolant to flow through the heater out of the plurality of heat exchangers;
a valve opening pattern configured to cause the coolant to flow through the heater and the cooler out of the plurality of heat exchangers; and
a valve opening pattern configured to cause the coolant to flow through the heater, the cooler and the radiator out of the plurality of heat exchangers.

5. The cooling circuit according to claim 4, wherein:
the valve unit includes a valve opening pattern configured to cause the coolant to flow only through the radiator out of the plurality of heat exchangers.

6. The cooling circuit according to claim 1, wherein:
the valve unit is arranged downstream of the exhaust heat recovery system in the first circulation circuit; and
the second circulation circuit is branched off from the first circulation circuit between the exhaust heat recovery system and the valve unit and joins the first circulation circuit at a position downstream of the valve unit.

7. The cooling circuit according to claim 6, wherein:
the valve unit has a valve opening pattern configured to shut off all circulation circuits passing through the valve unit including the first circulation circuit.

8. The cooling circuit according to claim 1, wherein:
the plurality of heat exchangers includes a heater configured to heat an inside of a cabin of a vehicle mounted with the internal combustion engine through heat radiation from the coolant; and
the first circulation circuit further includes the heater.

9. The cooling circuit according to claim 1, wherein:
the plurality of heat exchangers includes a cooler configured to cool lubricating oil of a transmission configured to change a speed of output rotation of the internal combustion engine through heat radiation to the coolant; and
the first and second circulation circuits further include the cooler, and the exhaust heat recovery system is arranged upstream of the cooler.

10. The cooling circuit according to claim 1, wherein:
the exhaust heat recovery system includes a heat exchanger configured to perform heat exchange between the exhaust air and the coolant;
the exhaust heat recovery system is configured as a bypass-less exhaust heat recovery system configured to cause flowing-in exhaust air to flow via the heat exchanger.

11. The cooling circuit according to claim 1, wherein:
the second circulation circuit circulates the coolant in a state where the pressure-feeding pump is feeding the coolant under pressure.

* * * * *